Oct. 27, 1942.  W. H. GALE ET AL  2,299,814
PIPE DRILLING APPARATUS
Filed Jan. 2, 1940  2 Sheets-Sheet 2

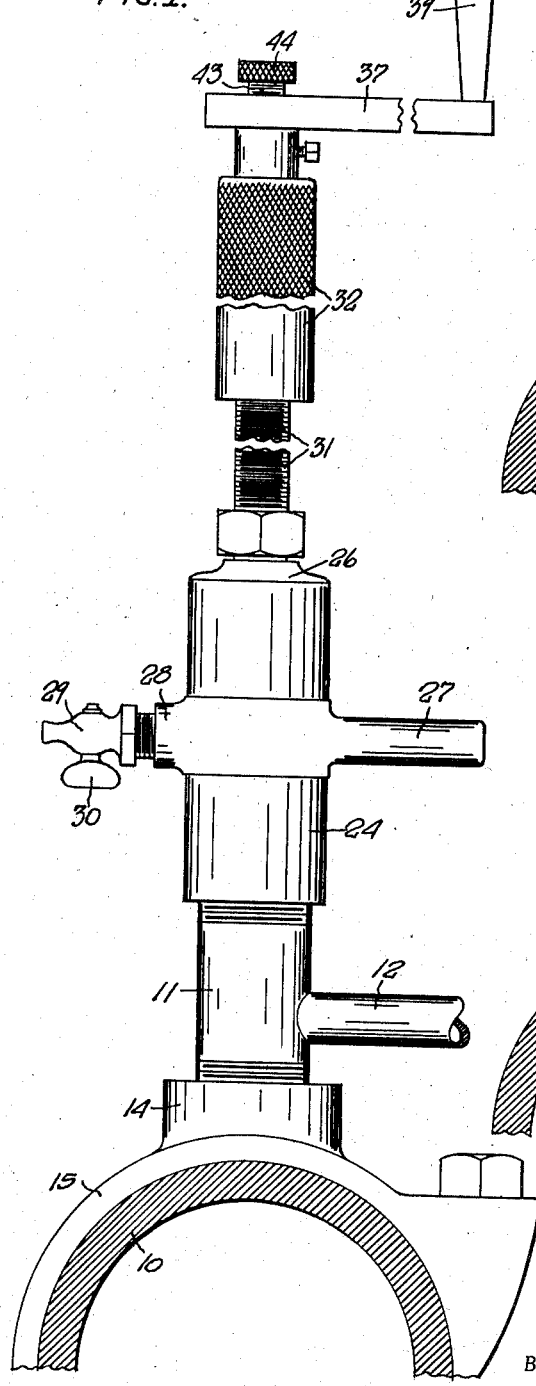

WALTER H. GALE.
PATTERSON D. MERRILL.
INVENTORS.

BY Oltsch & Knoblock
ATTORNEYS.

Patented Oct. 27, 1942

2,299,814

UNITED STATES PATENT OFFICE 2,299,814

PIPE DRILLING APPARATUS

Walter H. Gale and Patterson D. Merrill, South Bend, Ind., assignors to M. B. Skinner Company, South Bend, Ind., a corporation of Indiana Application January 2, 1940, Serial No. 312,078

12 Claims. (Cl. 77—41)

This invention relates to pipe drilling apparatus, and more particularly to apparatus for drilling a hole in a main for establishing communication between the same and a branch connector which has been suitably secured to the main preparatory to the opening of a branch for service. Branch connectors of the type used for such installations include a self-closing valve through which a drill may be passed and by means of which the connector may seal itself upon withdrawal of the drill to prevent leakage of gas or the like from the connector prior to the time that a suitable sealing cap may be applied over the opening of the connector through which the drill is inserted. However, the leakage of gas in the event the valve does not fully close is quite dangerous, and it is, therefore, desirable to provide some means for testing the valve prior to disconnection of the drilling assembly in order to insure against occurrence of the leakage. In many instances, from a practical standpoint, it may be preferred to entirely abandon a particular leaky connection rather than run the risk entailed by escape of gas during the interval between disconnection of the drill apparatus and application of a seal to the connector. However, in order that this may be done, it is obvious that some means must be provided for sealing the opening which has been cut in the main, and for disconnecting the sealing unit from the remainder of the drilling apparatus in order that the drilling apparatus may be disconnected from the abandoned connector. No device which is capable of use as aforesaid has been provided heretofore, to the best of our knowledge.

Also, it is necessary, where a branch which has previously been in service is to be abandoned, that some means be provided for sealing the connection between the main and the connector in order that the branch pipe itself may be disconnected from the main. In order to do this, it is necessary that apparatus be provided which first establishes a sealed joint with the branch connector, then applies a positive seal to the opening in the main, and then facilitates disconnection of the applying apparatus and the sealing element.

It is the primary object of the instant invention to provide means for accomplishing the foregoing operations.

A further object is to provide a device of this character having a branch connector adapted for sealed mounting on a main, and provided with a self-closing valve adjacent to the outer end or access opening of the connector, and an apertured partition adjacent the main.

A further object is to provide a device of this character having an adaptor unit for sealed connection with a branch connector, said adaptor unit having a test valve.

A further object is to provide a device of this character including an elongated adaptor, a tool insertible through a branch connector for engagement with a main, and tool operating means having an externally operable member for releasably connecting the tool.

A further object is to provide a device of this character wherein the branch connector has an abutment with a screw threaded aperture, and a pipe engaging tool has a screw threaded stem for connection with said abutment.

A further object is to provide a device of this character having a tool applying device including a rotatable shaft having a central bore receiving an elongated pin having a tapered end, said shaft having a transverse passage adjacent its inner end to receive a pair of locking elements which are engageable by the tapered end of said pin to be shifted outwardly to the ends of said transverse passage, said elongated pin being longitudinally adjustable in said bore.

Other objects will be apparent from the description and appended claims.

In the drawings:

Fig. 1 is a cross sectional view of a pipe main illustrating in side elevation a branch connector and our improved drilling device.

Fig. 4 is a fragmentary sectional view illustrating the method by which a drill may be applied to a branch pipe connector to seal the opening in a main.

Fig. 5 is a view similar to Fig. 4 and illustrating a plug operatively connected with a branch pipe connector for sealing the opening in a main communicating with said connector.

Figure 3:
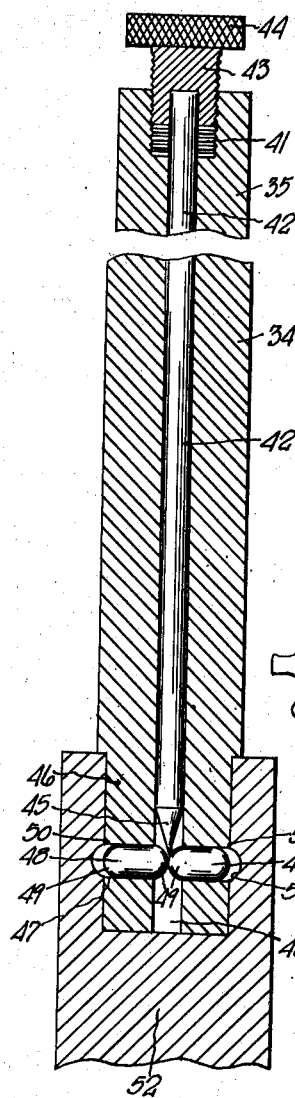
Fig. 3 is an enlarged fragmentary longitudinal sectional detail view of a portion of our device.
Figure 2:
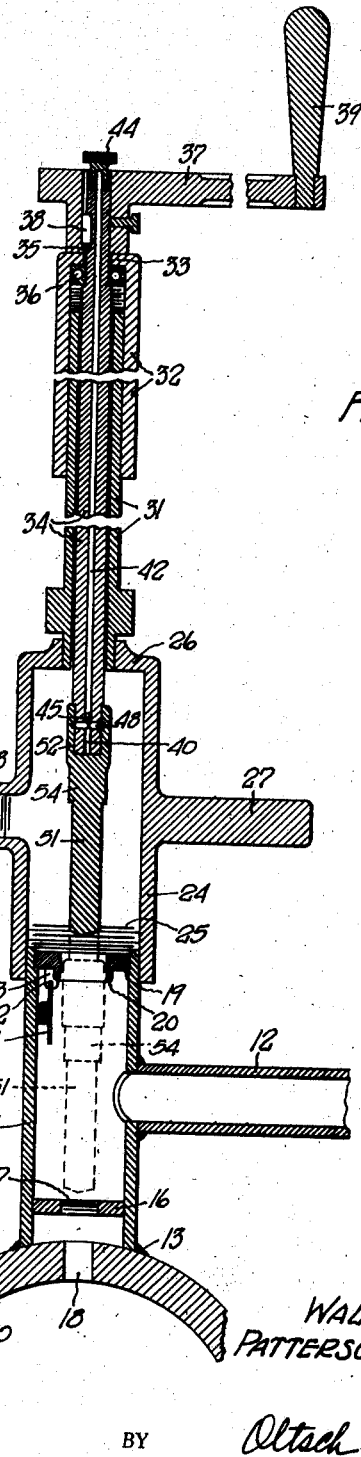
Fig. 2 is a fragmentary longitudinal sectional view illustrating our device applied to a branch connector on a main.

Referring to the drawings, which illustrate the preferred embodiment of the invention, the numeral 10 designates a pipe main to which a tubular connector 11 carrying a branch 12 is suitably connected. Branch connector 12 may be welded to the main at 13 as illustrated in Figs. 2, 4 and 5 or may be threaded in a neck 14 of a clamp element 15 secured to the main 10 in sealing relation. Within the branch connector 11 adjacent the main 10 is fixedly mounted a transverse collar or abutment 16 having a central screw threaded opening 17 of a diameter slightly larger than the diameter of an opening 18 which is to be drilled in the main 10. At the outer access end of the connector 11 is mounted a ring 19 having a depending collar 20 against which a flap valve 21 pivoted at 22 to arm 23 carried by the ring 19 is adapted to seat. Valve 21 is preferably so formed that outwardly directed fluid pressure passing from opening 18 in the main will be sufficient to force said valve 21 against the collar 20 for the purpose of sealing the ring 19 and the access opening of the flange connector 11 in which said ring is mounted.

An adaptor 24, preferably of elongated tubular form and internally screw threaded at 25 for sealing connection with the end of branch connector 11, has an opposite inwardly flanged end 26 forming an internally screw threaded collar. Intermediate its ends, adaptor 24 may have an integral laterally projecting handle member 27 and an internally screw threaded collar 28. A suitable test valve 29 having an operating handle member 30 may be threaded in the collar 28.

An elongated externally screw threaded tubular member 31 is threaded at one end into the collar 26 of adaptor 24. Tubular member 31 has a smooth interior bore. An elongated internally screw threaded sleeve 32 is mounted on the upper end of tube 31, said sleeve 32 having an inturned apertured flange 33 at it upper end. A shaft 34 fits snugly and rotatably within the tube 31, and has a reduced portion 35 at its upper end. A suitable bearing 36 fits on the shoulder formed at the juncture of the main and reduced portions of shaft 34, and the flange 33 of sleeve 32 in turn seats on said bearing 36. Sleeve 32 constitutes a feed screw controlling longitudinal shifting of shaft 34 in tube 31. A suitable operating lever 37 is keyed on a reduced end 35 of shaft 34 and 38. Lever 37 preferably carries a handle 39 at its outer end.

Shaft 34 is provided with a small concentric bore 40 extending throughout its length, said bore communicating with a concentric enlarged screw threaded opening 41 at its upper end. Bore 40 receives an elongated pin 42 whose upper end carries an externally screw threaded plug 43 mounted in enlarged bore portion 41. Plug 43 is preferably provided with a knurled hand piece 44. The lower end of pin 42 is preferably of conical form at 45. The lower end of shaft 34 is preferably configured at 46, as of reduced hexagonal formation. Substantially centrally of the length of said portion 46, shaft 34 is provided with a transverse passage 47. Pin 42 is preferably of a length slightly greater than the spacing of transverse passage 47 from the upper end of shaft 34. A pair of locking members 48 fit snugly in the ends of bore 47 and are slidable longitudinally thereof, said members 48 preferably being provided with rounded inner and outer ends 49. The overall length of each of the members 48 is preferably approximately equal to one-half the thickness of the reduced portion 46 of the shaft. Portion 46 of the shaft is preferably provided with an inturned or reduced dimension margin 50 at each outer end of the transverse passage 47 to retain members 48 in said passage.

Any suitable tool may be mounted on the lower end of the shaft 34. For example, in Fig. 2 we have illustrated a drill 51 having a socket 52 at its upper end configured to fit around the lower end portion 46 of shaft 34. This socket portion 52 is preferably provided with interior recesses 53 into which the outer ends of the members 48 may be forced to effect a locking engagement between the tool socket 52 and the shaft 34. As best illustrated in Fig. 4 the drill is provided with a threaded portion 54 of slightly greater diameter than the shank of the drill 51 and of lesser diameter than the socket 52. This threaded portion 54 is adapted for threaded engagement with the threaded aperture 17 of the abutment 16 of the branch connector. Another form of tool which may be mounted upon the shaft 4 is illustrated in Fig. 5 and comprises a sealing plug 55 having a socket 52 and a threaded portion 54 of the same construction as above described with reference to the drill 51.

The use and operation of the device are as follows: Assuming that a branch is to be connected to the main 10, a suitable connector 11 is secured to the main in sealed relation, as by welding or use of a clamp. Connector 11 has provided therein the apertured abutment member 16 and the valve assembly 19, 21. The drilling unit is then mounted on the connector by threading adaptor 24 on the end of connector 11. It will be understood that a suitable drill 51 is mounted on the shaft 34 prior to mounting the drilling unit on the connector. The parts are then in operative position, as illustrated in full lines in Fig. 2, for the purpose of beginning the drilling operation. The collar 32 constitutes a feed screw for the shaft 34, and as this is rotated the drill 51 is permitted to pass through the ring 19 and the aperture 17 to come into engagement with the main 10. Thereafter, by combined rotation of the lever 37 and of the feed screw 32, the drill may operate to form opening 18 in the main.

After the opening 18 has been drilled, the drill 51 may be withdrawn to the full line position shown in Fig. 2 by manipulation of feed screw 32. Under normal conditions, the pressure of the fluid exhausting from the main at the newly drilled opening 18 will serve to force the valve 21 closed against the collar 20 of the ring 19. In this event the upper end of the connector 11 will be substantially sealed, so that very little, if any, of the fluid from the main 10 will reach the interior of the adaptor 24, and no pressure of fluid will exist in said adaptor. Consequently, it is possible to test whether or not the valve 21 has seated by operating the handle 30 of the test valve 29. If fluid under pressure exhausts from valve 29, the operator is advised that the valve 21 has not seated. If there is no fluid pressure exhausted upon opening of test valve 29, the operator is assured that valve 21 has seated. In the latter instance, the operator may then remove the adaptor 24 and apply to the upper end of the connector 11 a suitable protective cap (not shown).

In the event the operator finds that the valve 21 has not seated, he is still protected against leakage as long as the adaptor 24 is retained on the connector. Consequently, an interval of time is afforded during which decision can be made as to whether the adaptor 24 should be removed so that the connector may be capped despite the failure of valve 21 to seat properly in the connector, or whether the connector 11 must be sealed and abandoned and a new connector 11 applied and connected with the branch line. If the latter is selected, it is necessary to seal the connector 11, and it is desirable that this should be done at the main. To accomplish this, the drill 51 is again run downwardly through the connector 11 and into the opening 18 in the main 10 by manipulation of the feed screw 32 and the lever 37. The drill 51 is lowered until the threaded portion 54 thereof reaches and engages the threads at the opening 17 of the abutment 16, and the drill is thence threaded fully into plate 16. In this way a double seal is effected, namely the closure of the opening 18 by the shank of the drill 51, and the threaded seal between the part 54 of the drill and the abutment plate 16. With this double seal, damage from gas escaping at the connector is positively avoided by simply using the drill itself as a seal. When the drill has been solidly seated, as shown in Fig. 4, the knurled hand piece 34 of plug 33 may be rotated to raise the pin 42 and thus withdraw the tapered head 35 thereof from between the inner ends of parts 48. The adaptor 24 can then be removed from the connector without disturbing the sealed position of the drill 51. The upward movement of the shaft 34 incident to the withdrawal of the adaptor 24, or incident to operation of the feed screw 32, causes release of the locking members 48 from the recesses 53 in the socket of the drill so that the drill may be left within the connector, and the remainder of the drilling equipment, including the adaptor 24, may be removed from the connector. It will thus be seen that at no time is it necessary to open the connector 11 to atmosphere while the same is in open or unsealed condition, and hence all danger of escape of fluid incident to the drilling of the main is entirely avoided, even in the case where the self-closing valve 21 fails to operate. It will readily be observed that the drill 51 is a comparatively inexpensive part of the unit, and the use thereof as a sealing member, as illustrated in Fig. 4, is not a serious matter from the cost standpoint.

The device is also useable to entirely disconnect a branch line, in which case the operation aforesaid is substantially repeated. However, the plug 55 is used in place of the drill 51. This arrangement is illustrated in Fig. 5. The same double seal between the plug 55 and the main opening 18, and between the threaded plug part 54 and the abutment plate 16, is afforded in using plug 55 as in the use of the drill 51 as aforesaid. The provision of the knurled hand piece 43, 44 for manipulating the pin 42 which controls the locking elements 48 serves to release the locking plug 55 after the seal has been effected in the same manner as hereinbefore specified with reference to the drill.

It will thus be seen that the device is simple in operation, provides for positive control of the operation, including a positive double seal in the event of sealing a connector at the main, and also provides means for testing a connector after drilling and before removing the drilling assembly. Of equal importance is the provision of the means for effecting connection and disconnection between the shaft 34 and the tool carried thereby from a point exterior of the apparatus per se.

We claim:

1. Pipe drilling apparatus adapted to be mounted on a main, comprising a branch connector, having an interior restricted diameter portion adjacent to said main and provided with a central threaded aperture, a conduit branching from said connector above said apertured restricted portion, a drill having a cutting portion smaller than said aperture and an enlarged threaded shank portion spaced from the cutting end of the drill a distance greater than the spacing of the upper face of said restricted portion from the adjacent inner face of said main and adapted to mate with said threaded aperture, and means carried by said connector for actuating said drill.

2. Pipe drilling apparatus as defined in claim 1, and means for locking said drill and actuating means, including a lock releasing element extending exteriorly of said actuating means.

3. Pipe drilling apparatus as defined in claim 1, wherein said actuating means includes a chambered adaptor mounted on said connector and having an opening in its wall, a test valve normally closing said adaptor opening, and a self-closing flap valve in said connector, said adaptor being elongated to receive said drill exteriorly of said self-closing valve while said adaptor is mounted on said connector.

4. Pipe drilling apparatus comprising a branch pipe connector, having a restricted diameter tool seat therein, a conduit branching from said connector above said seat, an adaptor mounted on said connector, an exteriorly screw threaded tube carried by said adaptor, a feed screw adjustable on said tube, an elongated shaft rotatable in said tube and carried by said feed screw, said shaft being of a length at least equal to the combined length of said adaptor and tube and having a longitudinal bore and a head at its inner end adapted to mount a tool socket, locking means carried by said head, and means mounted in said bore and projecting from the outer end of said shaft for actuating said locking means at least a portion of said tool having a sealing fit in said tool seat.

5. Pipe drilling apparatus as defined in claim 4, wherein said locking means comprises a pair of members mounted in a bore transverse of said shaft, and said actuating means includes an elongated pin slidable in the longitudinal shaft bore and having a tapered end insertable between said members to oppositely outwardly urge said members.

6. Pipe drilling apparatus comprising a branch pipe connector, having a restricted diameter tool seat therein, a conduit branching from said connector above said seat, a tool having an enlarged portion complementary to said tool seat, and means carried by said connector for rotating and manipulating said tool in said connector, including a shaft having releasable means for locking said tool on the inner end thereof, said shaft having a longitudinal bore, and means extending through and projecting from the outer end of said shaft bore for controlling said locking means.

7. The combination with a main conduit, of a connector conduit having a sealed connection with said conduit at one end, a transverse abutment in said connector adjacent said main, said abutment having a threaded aperture therethrough, a self-closing flap valve in said connector spaced from said abutment, and a conduit branching from said connector intermediate said abutment and valve, said aperture being of a size to freely receive a conduit engaging portion of a tool and complementary to a threaded portion of said tool, said conduit engaging portion of said tool being longer than the spacing between the outer face of said abutment and the inner face of the adjacent conduit portion and shorter than the spacing between the outer abutment face and the opposite conduit wall, said valve being adapted for insertion of said tool, including said threaded portion, therethrough when open.

8. The combination with a main conduit, of a tubular connector secured at one end to said main, a conduit branching from an intermediate portion of said connector, said connector having a reduced dimension portion intermediate said main and branch conduit and adapted for locking engagement with one portion of a tool having another portion freely insertable therethrough, and of a length to engage and pass through the adjacent conduit wall only, and a self-closing valve in said connector spaced outwardly from said branch and adapted for free insertion of said tool therethrough when open.

9. Pipe drilling apparatus comprising a branch connector, a branch connected to said connector at an intermediate portion thereof, a flap valve in the outer end of said connector, plug receiving means in said connector below said branch, an apertured adaptor detachably mounted on the outer end of said connector, a valve normally closing said aperture, a drill, and drill operating means mounted on the outer end of said adaptor, said adaptor being of a length at least as long as said drill, said drill having a long cutting portion adapted to pass freely through said plug receiving means and an enlarged plug portion adapted to interlock with said plug receiving means to seal said connector.

10. Pipe drilling apparatus comprising a tubular branch connector, a conduit branching from an intermediate portion of said connector, said connector having a reduced dimension portion below said branch connector, and adapted for locking engagement with one portion of a tool having another portion freely insertable therethrough and of a length to engage and pass through the adjacent wall only of the pipe on which the branch connector is mounted, a self-closing valve in the upper end of said connector above said branch and adapted for free insertion of said tool therethrough when opened, means detachably mounted on said connector for applying and manipulating said tool, including a chambered adaptor mounted on said connector, and a test valve carried by said adaptor.

11. Pipe drilling apparatus comprising a tubular branch connector, a conduit branching from an intermediate portion of said connector, said connector having a reduced dimension portion below said branch connector, and adapted for locking engagement with one portion of a tool having another portion freely insertable therethrough and of a length to engage and pass through the adjacent wall only of the pipe on which the branch connector is mounted, a self-closing valve in the upper end of said connector above said branch and adapted for free insertion of said tool therethrough when opened, means having a sealed connection with the outer end of said connector for applying and manipulating said tool, and means extending exteriorly of said tool applying means for controlling the connection between said tool and tool applying means.

12. Pipe drilling apparatus comprising a tubular branch connector, a conduit branching from an intermediate portion of said connector, said connector having a reduced dimension portion below said branch connector, and adapted for locking engagement with one portion of a tool having another portion freely insertable therethrough and of a length to engage and pass through the adjacent wall only of the pipe on which the branch connector is mounted, a self-closing valve in the upper end of said connector above said branch and adapted for free insertion of said tool therethrough when opened, means having a sealed connection with the outer end of said connector for applying and manipulating said tool, including a shaft connected with said tool and having a longitudinal bore, tool locking means carried by said shaft, and a member extending through said bore for actuating said locking means.

WALTER H. GALE.
PATTERSON D. MERRILL.